UNITED STATES PATENT OFFICE.

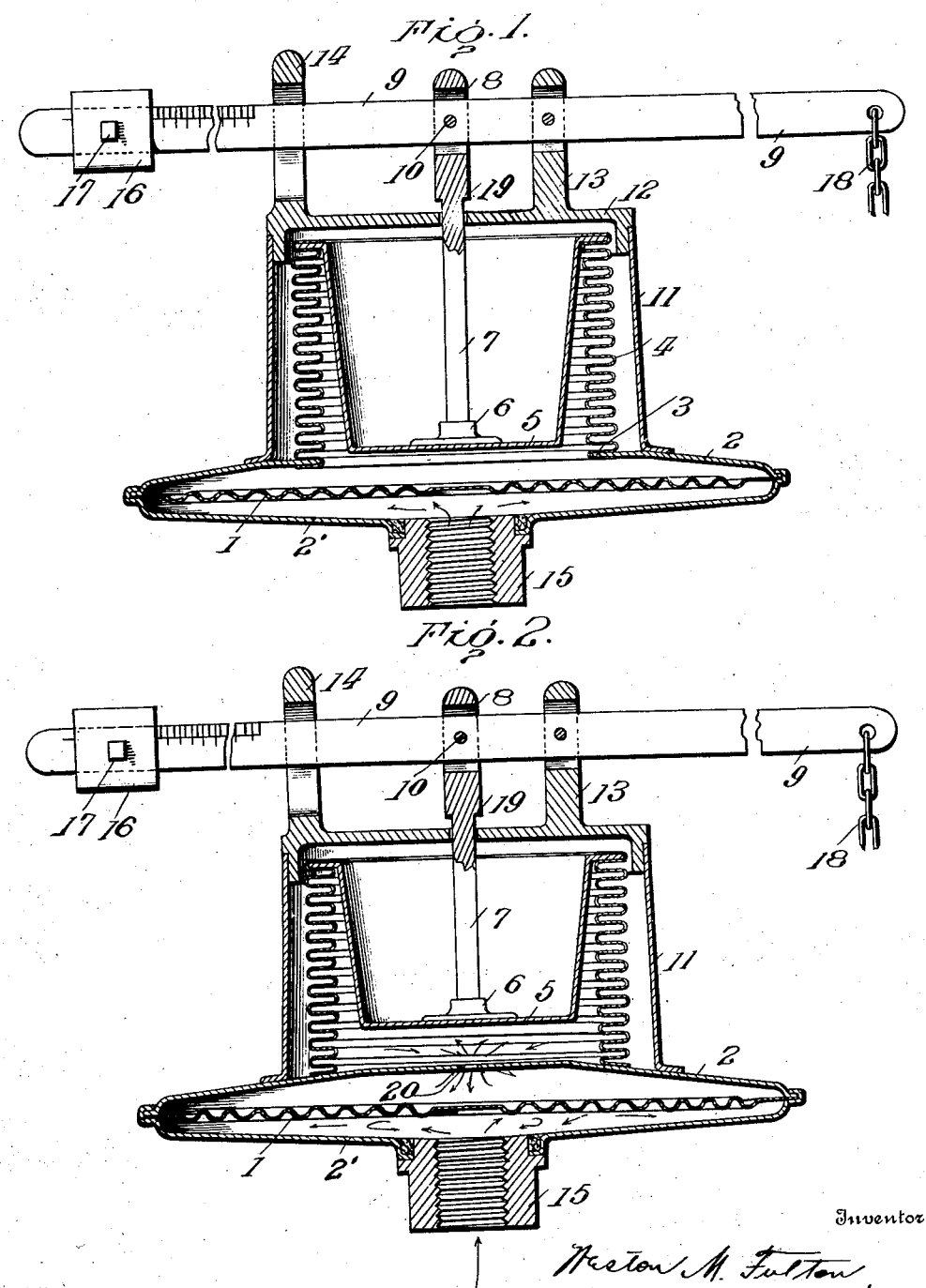

WESTON M. FULTON, OF KNOXVILLE, TENNESSEE, ASSIGNOR TO THE FULTON COMPANY, OF KNOXVILLE, TENNESSEE, A CORPORATION OF MAINE.

DEVICE FOR UTILIZING THE MOTION OF FLEXIBLE DIAPHRAGMS.

No. 897,730.     Specification of Letters Patent.     Patented Sept. 1, 1908.

Application filed March 24, 1905. Serial No. 251,914.

*To all whom it may concern:*

Be it known that I, WESTON M. FULTON, of Knoxville, Tennessee, have invented a new and useful Improvement in Devices for Utilizing the Motion of Flexible Diaphragms, which invention is fully set forth in the following specification.

This invention relates to devices for utilizing the motion of flexible diaphragms and especially such as are actuated by fluid pressure, and has for its object the transmission and utilization of the slight motion of a diaphragm without appreciable loss.

Heretofore it has been the custom to clamp a diaphragm at its outer periphery to any suitable rigid support and attach the rod or stem which is to transmit its motion to the center of such diaphragm. The objection to this arrangement is that the diaphragm buckles about the point of attachment of the stem resulting in a loss of motion that would otherwise be imparted to the stem. To overcome such buckling it has been proposed to provide the stem with a flange attachment extending nearly over the whole surface of the diaphragm. This arrangement obviously reduces the flexible portion of the diaphragm and confines it to an annular ring at the periphery of the diaphragm, thereby greatly reducing its efficiency.

To overcome the above objections and utilize without loss the motion of the diaphragm, I transmit the motion of the diaphragm to a body of fluid confined on one side of the same which in turn transmits this motion to an inflexible but movable wall to which may be attached the actuating rod or stem for transmitting motion to the part to be moved, such as a valve stem for controlling a fluid supply.

According to this invention I provide an expansible and collapsible vessel having corrugated walls capable of resisting lateral displacement and having a rigid end wall preferably reëntering, the other end of the vessel being secured to the support for retaining the diaphragm. The space inclosed by the collapsible vessel and the diaphragm is filled with a fluid, such as oil, and the vessel sealed. Any movement of the diaphragm will now be transmitted to the movable wall without lost motion by the diaphragm. In order that this may be better understood, certain mechanical expressions of the inventive idea involved are shown in the accompanying drawings, which are designed merely as illustrations to assist in the description of the invention and not as defining the limits thereof.

In said drawings—Figure 1 shows in vertical section one form of the invention, and Fig. 2 a modification thereof.

In Fig. 1, 1 is a diaphragm preferably corrugated circumferentially to increase its flexibility and is securely fastened between two rigid disks 2, 2', preferably in the form of frustra of cones. Secured at its inner edge 3 is a corrugated sheet-metal wall 4, which is rigid enough to resist outward movement, having its opposite end closed by a reëntering rigid end wall 5, which preferably extends well into the space surrounded by the corrugated wall, thereby reducing the space between the reëntering wall 5 and corrugated wall 4. 6 is a plate brazed or welded to the movable end wall, to which is secured a rod 7, having a slot 8 at its end for receiving a lever 9, pivoted therein at 10. A protecting casing 11 is secured to disk 2 at its bottom, and at its top supports a plate 12 provided with two slotted lugs 13 and 14, one for pivotally supporting lever 9 and the other serving as a guide and stop to limit the movements of the lever. 15 is a threaded connection fast to disk 2' for connecting the device to a source of fluid pressure such as a low pressure steam boiler. 16 is a weight for increasing the pressure on the end wall of the collapsible and expansible vessel when it is desired to set the device to operate at higher pressures, and is made fast to the arm 9 by means of a set screw 17. The opposite end of lever 9 is connected by means of a flexible connection 18 with a damper or valve, not shown. To limit the downward movement of the vessel 4, a shoulder 19 is provided on rod 7 which meets top-wall 12 at the extreme contraction of the vessel 4, while a similar limitation to the upward movement of the vessel is secured when the top of the corrugated wall reaches the underside of wall 12. The corrugations are thus protected from undue strain. The space bounded by the vertical wall 4, its end wall 5, and the diaphragm 1, is filled with a liquid, preferably oil, for the purpose of transmitting the movements of the diaphragm 1 to the movable end wall 5.

Having assembled the device as described, its operation is as follows. The damper chain is adjusted to allow the damper to be slightly open, and the weight positioned on the lever arm to permit the lever to be moved at a predetermined pressure. Live steam from the boiler is admitted to the space below the diaphragm 1 and its pressure transmitted by the fluid pressure means to the lever to be raised or lowered. When the steam-pressure reaches the predetermined amount for which the weight 16 is adjusted it will move diaphragm 1 upward, transmitting its motion without loss through the oil contained within the collapsible and expansible vessel to rigid end wall 5, forcing it upward, thereby lifting lever 9 and lowering the damper chain 18 to close the damper. On the fall of steam pressure this operation is reversed.

In Fig. 2 is shown a modification which is particularly useful in connection with pressures which fluctuate more or less rapidly, such as is experienced in using compressed air, in force pumps and the like, causing a rapid vibration of the diaphragm. To overcome this difficulty the movement of the oil resting immediately above diaphragm 1 is retarded by extending the disk 2 till a small opening 20 is left through which the oil must pass. This will damp the motion of the diaphragm so that it will move under steady pressure, but will not respond to sudden vibrations in pressure.

By reason of the construction herein described the entire movement of the diaphragm is transmitted to the actuating rod and the device is equally efficient whether employed on a pressure system of steam heating or in a vacuum system, which is a feature characteristic of this invention.

Since the steam does not come in contact with the corrugated wall to cause its deterioration, cheap material may be employed in its construction, such as steel, and, since the diaphragm is only subjected to fluid pressure, it is freed from strains due to inequality of pressure, and its life thus greatly prolonged.

Having thus described my invention, what is claimed is:—

In a device of the character described for utilizing the motion of a flexible diaphragm, the combination of a corrugated collapsible and expansible metallic vessel having a rigid movable end closure, a rigid plate having a central opening therein and fast to the opposite end of said vessel, a flexible diaphragm of larger diameter than that of said vessel fast to said plate for retaining in said vessel a power-transmitting liquid, means applying fluid pressure to said diaphragm and in open communication with a source of fluid pressure whose fluctuations are to operate the vessel, and power-transmitting means associated with said vessel.

In testimony whereof I have signed this specification in the presence of two subscribing witnesses.

WESTON M. FULTON.

Witnesses:
W. W. BERRY,
E. J. S. HYATT.